March 24, 1942.    C. T. MORSE    2,277,247
APPARATUS FOR MULTIPLE ROOM HEATING AND AIR CONDITIONING
Filed Feb. 1, 1939    8 Sheets-Sheet 1

Fig.1.

Inventor
Clark T. Morse,
Attorneys

Inventor
Clark T. Morse,
By
Attorneys

March 24, 1942. C. T. MORSE 2,277,247
APPARATUS FOR MULTIPLE ROOM HEATING AND AIR CONDITIONING
Filed Feb. 1, 1939 8 Sheets-Sheet 6

INVENTOR
CLARK T. MORSE
BY
ATTORNEYS

March 24, 1942.  C. T. MORSE  2,277,247
APPARATUS FOR MULTIPLE ROOM HEATING AND AIR CONDITIONING
Filed Feb. 1, 1939  8 Sheets-Sheet 7

Fig. 13.

INVENTOR
CLARK T. MORSE
BY
ATTORNEYS

Patented Mar. 24, 1942

2,277,247

UNITED STATES PATENT OFFICE 2,277,247

APPARATUS FOR MULTIPLE ROOM HEATING AND AIR CONDITIONING

Clark T. Morse, Detroit, Mich., assignor to American Blower Corporation, Detroit, Mich., a corporation of Delaware Application February 1, 1939, Serial No. 254,073

9 Claims. (Cl. 237—49)

This invention relates to heating and ventilating apparatus.

It is the object of this invention to provide for one or more rooms, particularly in connection with small homes, a unit heating and ventilating apparatus that can be placed in a closet or a corner of the kitchen, in the ceiling or below the floor, or adjacent corners of multiple rooms so that all the rooms can be supplied from a common unit.

It is the object of my invention to eliminate in small homes the primary cost of building such homes, which is the present system of independent radiators and piping from a central heating system.

It is the object of this invention to provide a central heater located either in a closet, the kitchen or the cellar of the small home, with only the simple piping necessary to connect it to the unit heater or ventilator of this invention.

It is the object of this invention to provide such a unit heater or ventilator with only a single heater in association with a coil of heating pipes with fins.

It is a further object to provide a unit with a fan in the center thereof, a coil or other form of heating piping with fins around the fan so arranged that the air is taken in centrally of the fan and discharged radially through a plurality of outlets leading from the top of a cabinet or closet into adjacent rooms. By locating such closet or cabinet and the unit at the center of the house adjacent the corners of the rooms, it is possible to supply from a single unit all of the heating and ventilating capacities desired with a minimum of outlets and with a single heater. In this way the principal cost of erecting small homes is eliminated. The further advantage of this invention is that in summer time, air can be circulated to and from the various rooms and in and out of the house to give all the benefits of forced ventilation, and by connecting the inlet and outlet piping to cold water lines, air conditioning of the rooms and the cooling of them can be effected in summer time.

It is a further object of this invention to provide means of providing a simple unit that is self-supporting and self-sustaining, that supports the motor and fan against vibration and noise, and supports the heating coils in a predetermined relationship with respect to the fan.

Referring to the drawings:

Figure 12 is a section through a closet or other enclosure below the ceiling on which has been mounted on a partition or false ceiling, the unit of this invention which is thus located in a plenum chamber having a plurality of outlets into one or more rooms.

Referring to the drawings in detail, more particularly to Figures 1 to 8, 1 designates a cellar, having cellar windows 2, in which is located a boiler 3 connected by pipes 4 and 5 to an air conditioning unit 6 which is located in the top of a closet 7. The bottom of this closet communicates through louvers 8, 9 and 10 with adjacent rooms from which air is drawn and moved upwardly through the closet 7 into the unit 6, whence it is discharged back into the rooms through the pipes 11, 12, 13 and 14.

The air thus moved is caused to so move by the air conditioning unit 6, which is constructed as follows. A supporting ring 15 is attached by the screws 16 to the wooden framework 17 at the top of the closet 7. Grille 18 is also attached to the top of the closet through which the air passes into the fan generally designated 19. In doing so the incoming air passes over the fan motor 20 as supported upon coil springs 21 which are in turn supported by arms 22 mounted on a ring 23 that is bolted by bolts 24 to the flange 25 of the supporting ring 15.

This motor 20 has mounted on its armature shaft 26 a fan consisting of a horizontal plate 27 on which is mounted a plurality of vertically disposed radially positioned fan blades 28 that are fastened to the plate 27. Thus the air is drawn in vertically and discharged radially over the coil of the heating pipes 30 having fins 31. These pipes are arranged one above the other and held in position by the supporting means 32 which is attached by the rivets 33 to the flange 25 of the ring 15. The top of these coils is engaged by filler plates 34.

Figure 1:
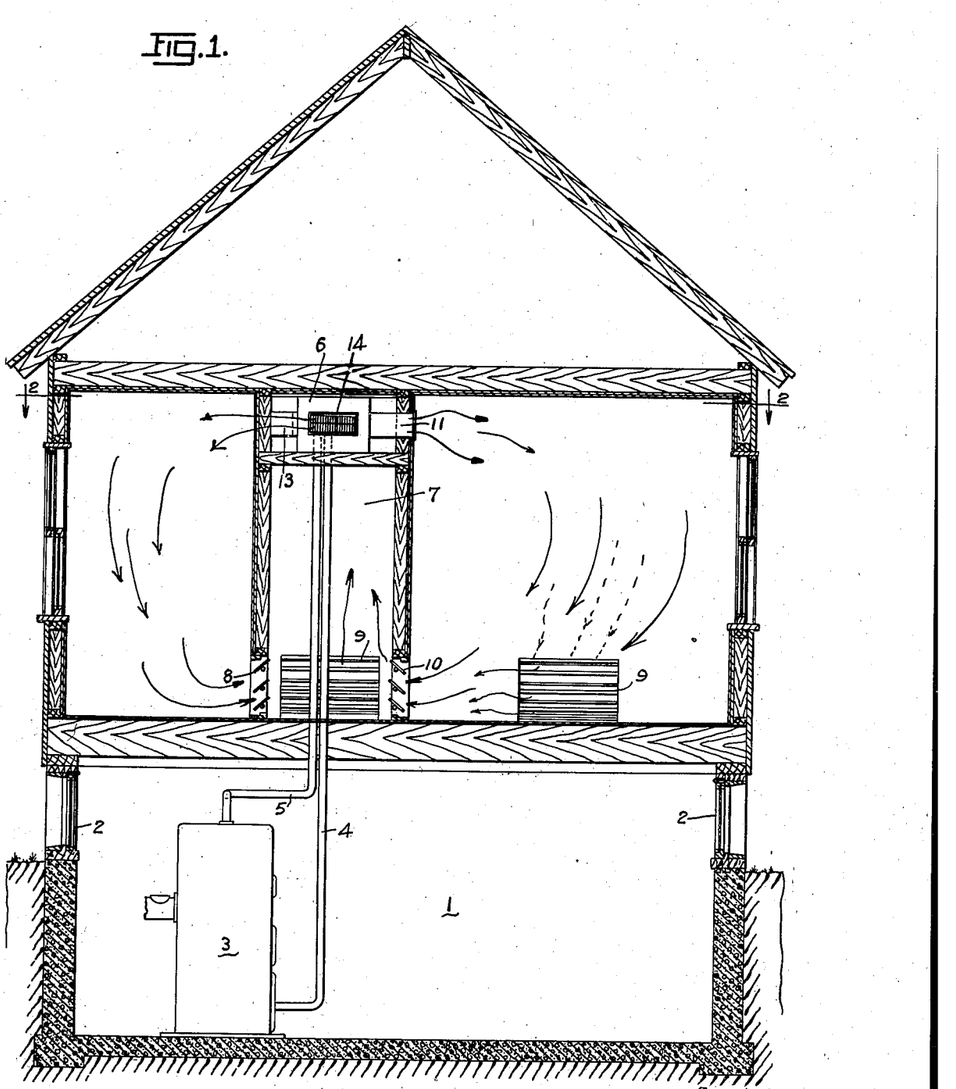
Figure 1 is a vertical section through a four room house showing the location of the heating and ventilating unit of this invention in the top of a closet with a boiler for supplying the requisite heat in the cellar.
Figure 2:
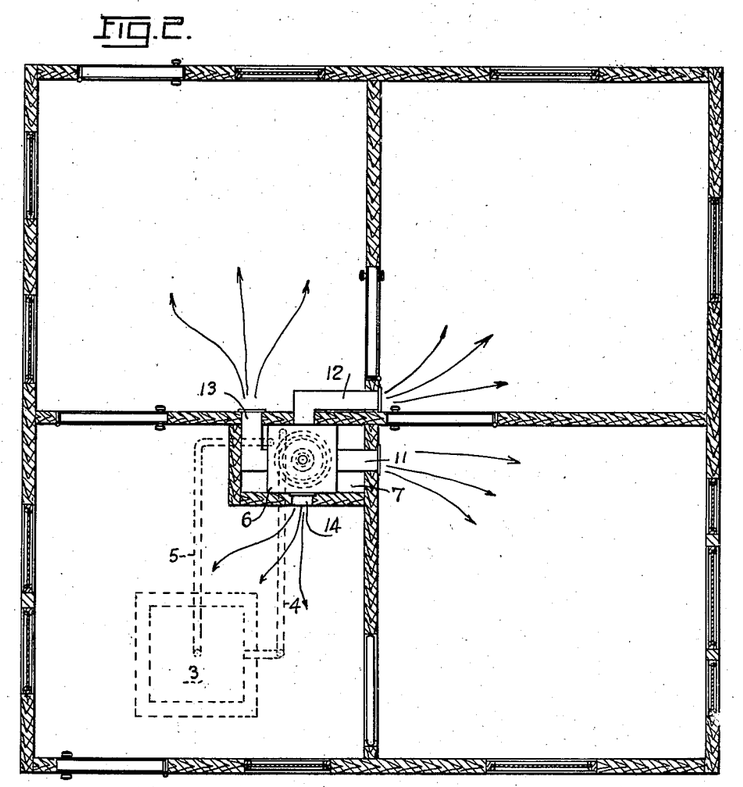
Figure 2 is a section on the line 2—2 on Figure 1.
Figure 3:
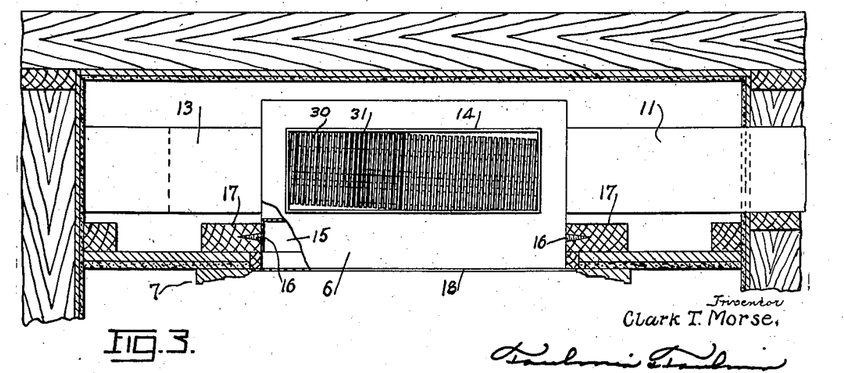
Figure 3 is a detailed side elevation with the building and closet top in section and a part of the unit in section showing the discharge outlet adjacent the heating coils.
Figure 4:
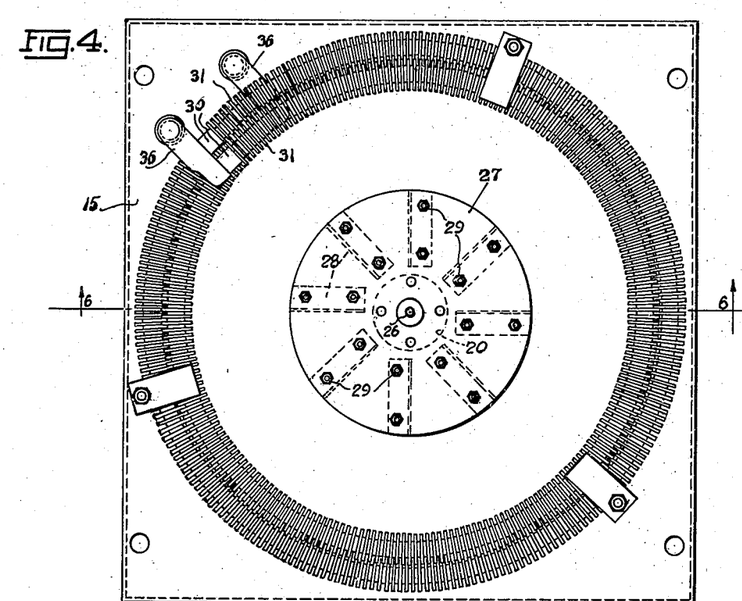
Figure 4 is a top plan view of the unit.
Figure 5:
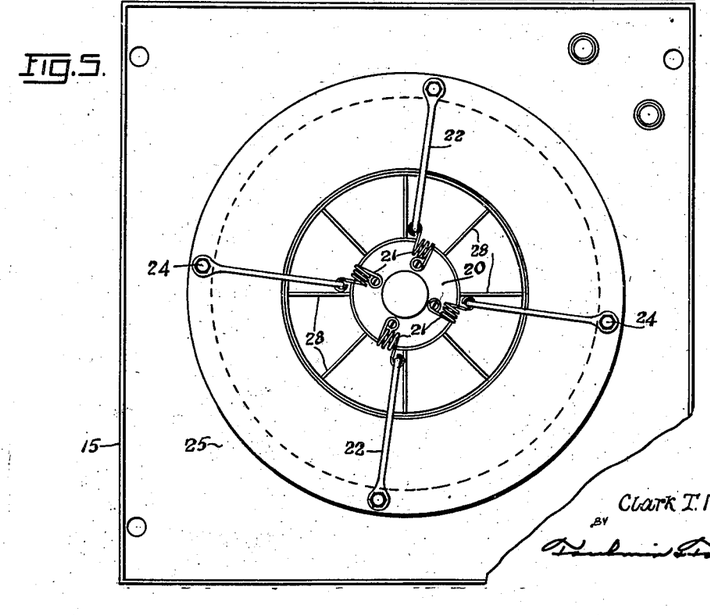
Figure 5 is a bottom plan view of the unit.
Figure 6:
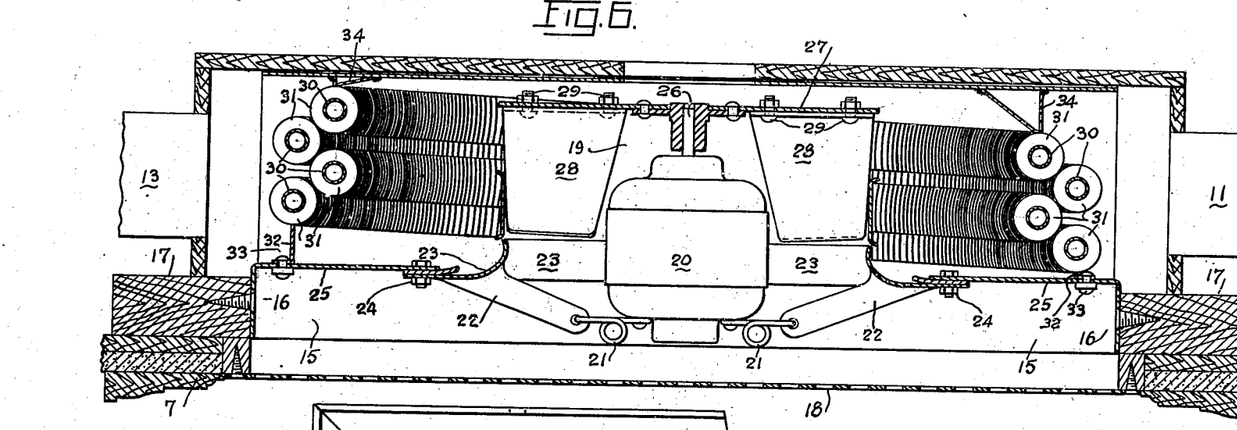
Figure 6 is a detailed transverse section on the line 6—6 of Figure 4 showing the fan, its operating motor and support, the coils, their support, the top casing and bottom casing which supports all members.
Figure 7:
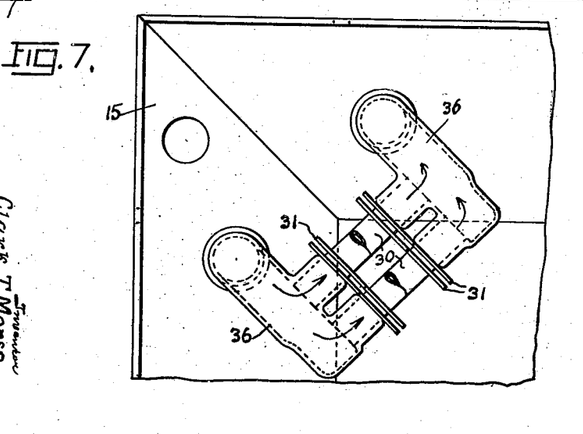
Figure 7 is a detailed plan view of the header, or headers, of the unit.
Figure 8:
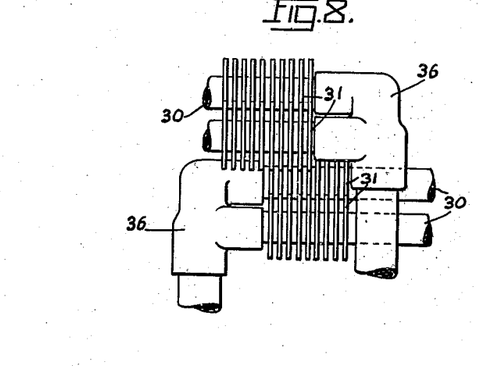
Figure 8 is a similar view in elevation.
Figure 9:
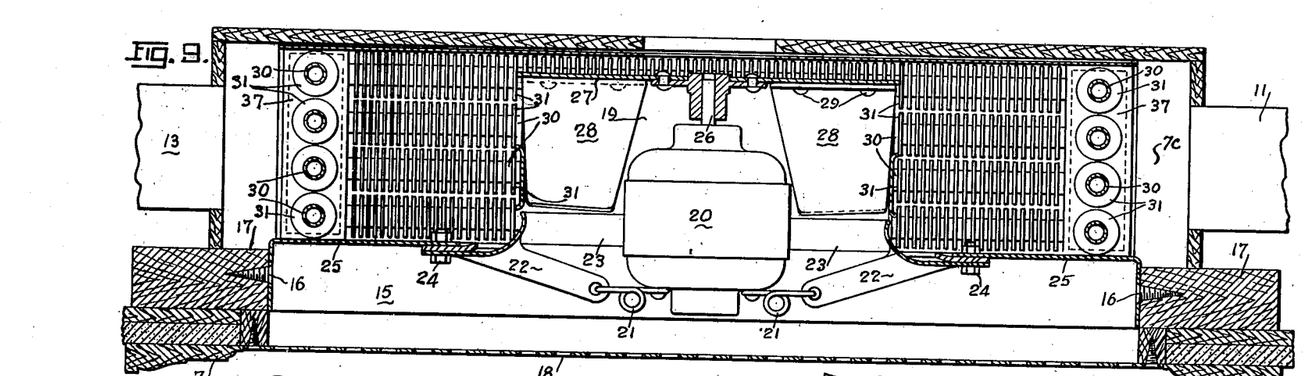
Figure 9 is a vertical section on the line 9—9 of Figure 10 through a modified form of the unit showing the use of a heating coil having straight finned pipes.
Figure 10:
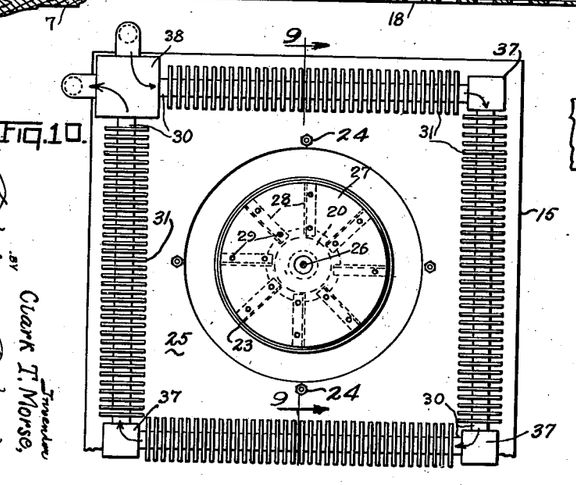
Figure 10 is a detailed plan view of the modified form, showing a common header at one corner thereof.
Figure 11:
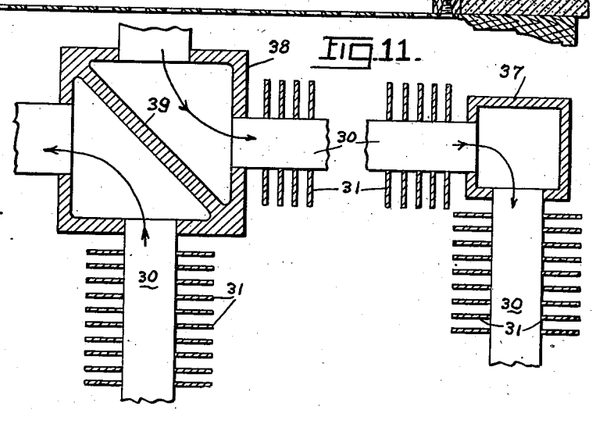
Figure 11 is an enlarged horizontal section of the modified form.

The ends of the pipes 30 are joined together in adjacent or common headers, such as the headers 36. A marked economy is effected by using a circular coil with a simple heater system, preferably a unitary heater. If desired, a series of straight pipes with fins may be employed as shown in Figures 9, 10 and 11, where the ends of the pipes are joined together with connections 37. They are connected to a common header 38 divided by a partition 39.

During the summer time, the heating pipes can be cut off from the boiler 3 and the pipes can be connected to the cold water lines of the domestic supply for cooling purposes. Thus the system is capable of heating and ventilating in winter with a very economical heater, and a single unit heater and ventilator can be used as a ventilator night and day in the summer, and also be used as a cooler in summer.

All the expense of piping to each room for independent radiators is eliminated, making it possible for houses of single or multiple rooms to have the advantages of a complete heating and ventilating system at a very modest cost.

In Figure 12 there is shown a modified form of unit arranged within a plenum chamber.

Figure 13:
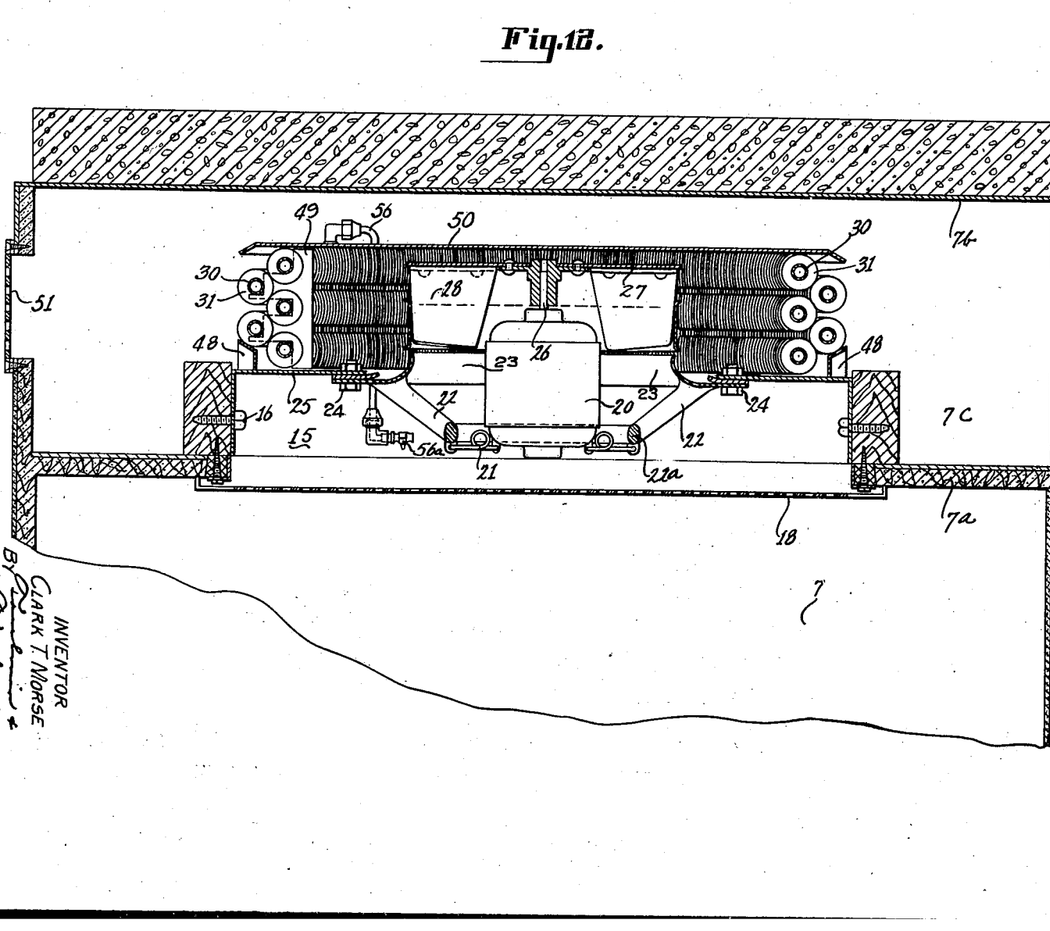
Figure 13 is a top plan view of the unit shown in Figure 12 with one part of the cover broken away.
Figure 14:
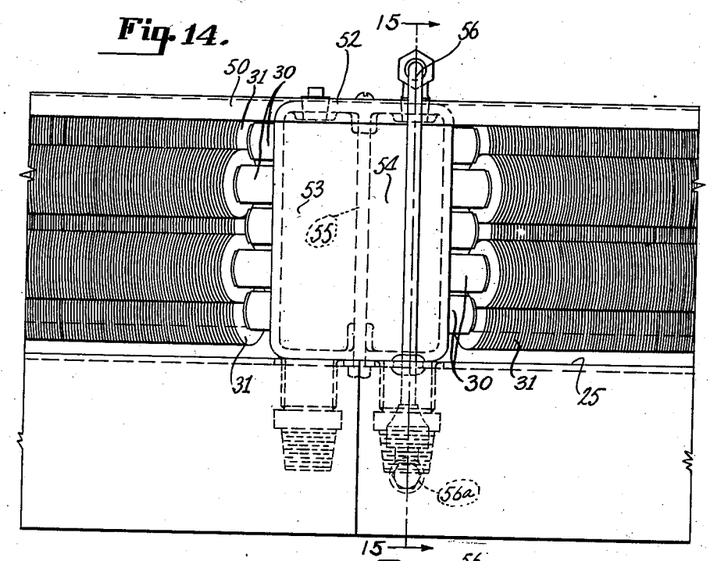
Figure 14 is a detail side elevation of the unit shown in Figure 13 illustrating the arrangement of the header construction.
Figure 15:
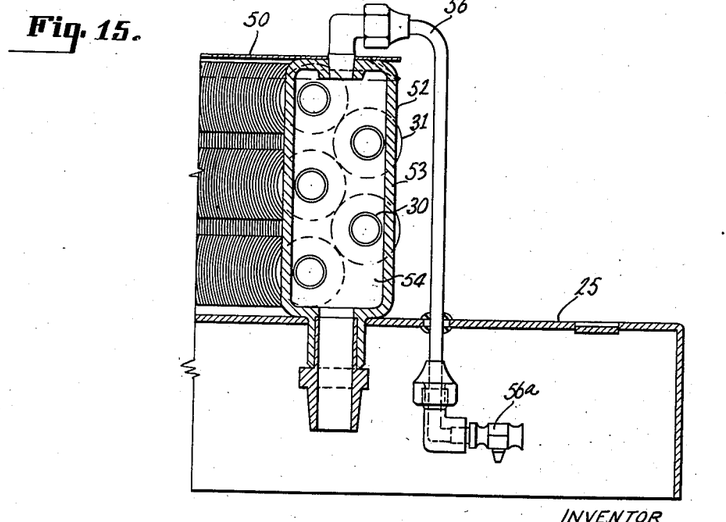
Figure 15 is a section on the line 15—15, looking in the direction of the arrows, on Figure 14.

In Figure 13, as in Figure 12, and in Figures 14 and 15, there is shown the further details of a modified form of the unit per se. This unit can be mounted in the false ceiling of a closet 7. This false ceiling in Figure 12, marked 7a, forms with the ceiling of a room 7b a plenum chamber as seen in Figures 9 and 12 designated 7c.

Referring specifically to Figures 12 to 15 inclusive, the supporting base plate 25 has mounted thereon a flanged ring 48 within which are mounted a plurality of staggered finned coils 30 with fins 31 having positioning and spacer plates 49 with a flanged cap 50 extending over the coils to form an enclosure with the ring 48 and the supporting plate 25. The ring 25 is also provided with the flanged ring 23, attached to it by the bolt 24 and having a plurality of arms 22 having their inner ends connected by a ring 22a. Springs 21 support the motor 20 and its fan 28.

An exit space is provided between the ring 48 and the cap 50 through which air is driven by the fan 28, after the air has passed over the coils 30 and thence the air passes into the plenum chamber 7c and makes its exit into one or more rooms through the grilles or gratings 51. The plenum chamber serves as a distribution area and a mixing chamber so that an even distribution of air can be effected with or without ducts to a plurality of rooms.

This unit can be installed in any house and in any building enclosure as it can be shipped direct from the factory in its assembled condition or in condition for ready assembly. Due to its low vertical dimension it can be very easily mounted in the top of a closet in a space that otherwise would be largely wasted.

In the form shown in Figures 12 to 15, it will be observed that a single header casting is employed, designated generally 52. This header casting is divided into two compartments 53 and 54 by the partition 55. Each compartment is suitably connected to the usual supply and return lines. 56 designates an air vent line connected into the compartment 54 of the header 52. 56a designates a valve which is located beneath the supporting plate 25, where it is accessible. Thus only a single header is necessary with the corresponding saving in cost.

It will be understood that I desire to comprehend within my invention such modifications as may be necessary to adapt it to varying conditions and uses.

Having thus described my invention, what I claim as new and desire to secure by Letters Patent is:

1. In combination, with a multiple room dwelling, of a unit heater and ventilator comprising a casing formed in part by the walls of said rooms having an air inlet opening in at least one of said walls, means partitioning said casing to form a plenum chamber in the top portion thereof and having an air passage therethrough, a plurality of discharge openings in the walls of said plenum chamber to said rooms, a heat exchange coil therein and a fan within said coil arranged to discharge air radially over said coil into said plenum chamber for distribution out of said discharge openings into the rooms.

2. In combination, with a multiple room dwelling, of a unit heater and ventilator comprising a casing formed in part by the walls of said rooms having an air inlet opening in at least one of said walls, means partitioning said casing to form a plenum chamber in the top portion thereof and having an air passage therethrough, a plurality of discharge openings in the walls of said plenum chamber to said rooms, a heat exchange coil therein and a fan within said coil arranged to discharge air radially over said coil into said plenum chamber for distribution out of said discharge openings into the rooms, said casing comprising a closet in one of said rooms at the top of which said unit is mounted.

3. In combination, a multiple room house, a closet in one of said rooms adjacent all of the rooms, said closet having an inlet air opening in the bottom thereof, means partitioning said closet to form an air discharge plenum chamber in the top portion thereof having means for the passage of air therethrough, a heating and ventilating unit mounted at the top of said closet and discharging air into said plenum chamber, said plenum chamber having discharge openings therefrom to each of said rooms.

4. In combination, a multiple room house, a closet in one of said rooms adjacent all of the rooms, said closet having an inlet air opening in the bottom thereof, means partitioning said closet to form an air discharge plenum chamber in the top portion thereof having means for the passage of air therethrough, a heating and ventilating unit mounted at the top of said closet and discharging air into said plenum chamber, said plenum chamber having discharge openings therefrom to each of said rooms, said unit comprising a heat exchange coil and a fan within said coil positioned over the air passage means in said partitioning means.

5. In combination, a multiple room house, a closet in one of said rooms adjacent all of the rooms, said closet having an inlet air opening in the bottom thereof, means partitioning said closet to form an air discharge plenum chamber in the top portion thereof having means for the passage of air therethrough, a heating and ventilating unit mounted at the top of said closet and discharging air into said plenum chamber, said plenum chamber having discharge openings therefrom to each of said rooms, said unit comprising a heat exchange coil and a fan within said coil positioned over the air passage means in said partitioning means, and means for supporting a fan driving motor in said air passage means in said partitioning means at the top of the closet in the path of the incoming air.

6. In combination, in a multiple room house, of a closet in one corner of said rooms adjacent the corners of all the rooms, a heating and ventilating unit in the top of said closet adapted to discharge radially through openings in the walls of said closet into each of said rooms, said unit comprising a casing formed in part by said closet walls, a partition wall having a centrally located air inlet opening forming a plenum chamber thereabove within which said unit is positioned, a fan and motor suspended thereunder and a central coil arranged around said fan and between it and said discharge openings.

7. In combination, with a multiple room dwelling, of an enclosure formed at least in part by the walls of adjacent rooms of the dwelling, an air treating unit comprising a heat exchange coil surrounding a fan, said air treating unit being positioned within said enclosure whereby said enclosure forms a casing for said unit, means positioned below said unit dividing said casing into an air discharge plenum chamber and an air inlet chamber, air inlet means for said inlet chamber, a plurality of outlet openings in the walls of said plenum chamber through which air is discharged into the room associated with the respective outlet, said fan discharging air radially over said coil into said plenum chamber from which it distributes to said rooms through said openings.

8. In combination, an enclosure formed in part by the walls of a building and having a false ceiling with air passage means therein thereby dividing said enclosure into an upper and a lower chamber, an air inlet for said lower chamber, said upper chamber having a plurality of openings therefrom into rooms adjacent said walls, an air treating unit mounted above said air passage means in spaced relationship to the walls of said upper chamber, said unit comprising a base plate which separates the upper chamber from the lower chamber and having an aperture for the passage of air received from the air passage means in said false ceiling, a motor suspended in said aperture, a radial delivery fan mounted on said motor, a plurality of heat exchange coils arranged around said fan whereby air is drawn from the lower chamber and discharged by the fan radially over said coils into the upper chamber and thus distributed out of the upper chamber into adjacent rooms.

9. In combination, with a multiple room dwelling, of an enclosure formed at least in part by the walls of adjacent rooms of the dwelling, an air treating unit comprising a support base having an opening therein for the passage of air, a motor supported upon said base, a fan driven by said motor, and a heat exchange coil surrounding said fan and supported on said base, said air treating unit being positioned within said enclosure whereby said enclosure forms a casing for said unit, said support base for said unit dividing said casing into an air discharge plenum chamber and an air inlet chamber with the opening therein providing the air passage means therebetween, air inlet means for said inlet chamber, a plurality of air outlet openings in the walls of said plenum chamber through which air is discharged into the rooms associated with the respective outlets, said fan discharging air radially over said coil into said plenum chamber from which it distributes to said rooms through said openings.

CLARK T. MORSE.